April 3, 1951 A. E. YOUNG 2,547,355
POTATO DIGGER HAVING VINE CUTTER
Filed May 29, 1946 2 Sheets-Sheet 1

INVENTOR
AUSTIN E. YOUNG

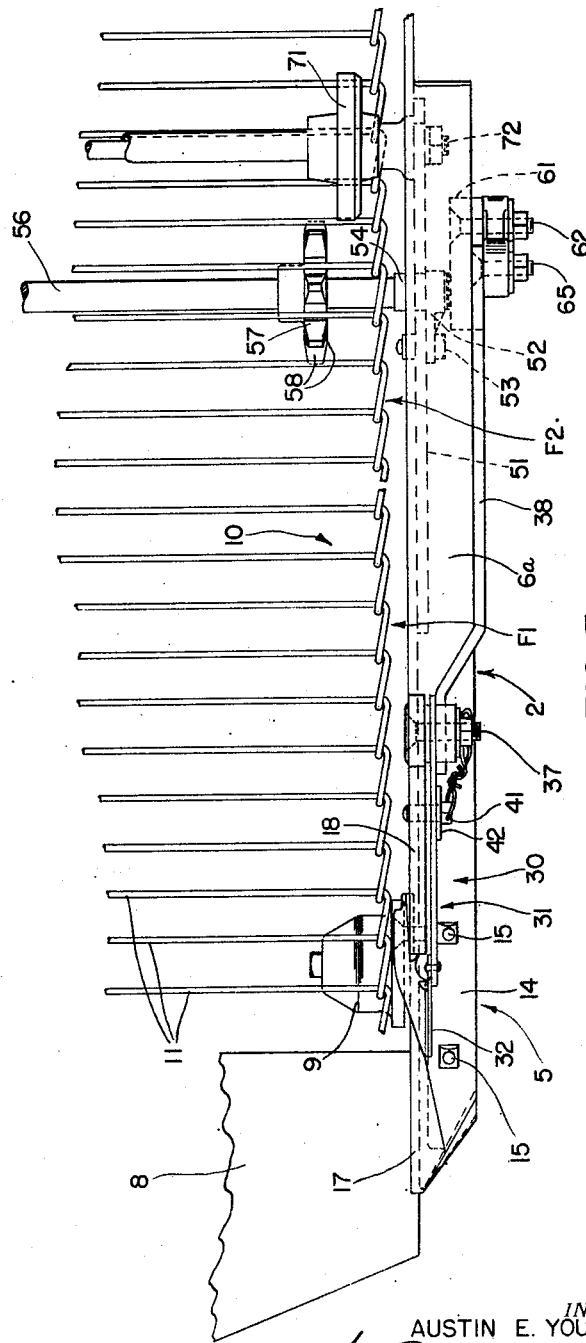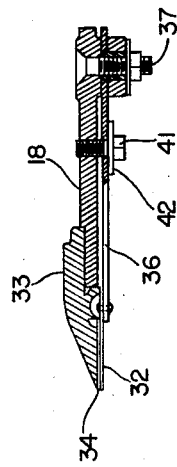

Patented Apr. 3, 1951

2,547,355

UNITED STATES PATENT OFFICE 2,547,355

POTATO DIGGER HAVING VINE CUTTER

Austin E. Young, Syracuse, N. Y., assignor to Syracuse Chilled Plow Co., Inc., Syracuse, N. Y., a corporation of New York Application May 29, 1946, Serial No. 672,976

7 Claims. (Cl. 55—107)

The present invention relates generally to agricultural machines and more particularly to harvesters, such as potato diggers and the like.

The object and general nature of the present invention is the provision of a potato digger especially adapted for use in digging sweet potatoes and other crops where there is a considerable amount of vines and other trash required to be handled in digging the crop. More particularly, it is an important feature of this invention to provide a potato digger with a pair of vine cutter attachments, one for each side of the shovel unit, and mounted on the latter in a position to cut into tangled vines and the like, especially those that run entirely across from one row to another. Another important feature of the present invention is the provision of a vine cutting attachment for potato diggers and the like, in which the attachment is actuated by suitable drive connections associated with the potato conveyor chain. In this way the driving of the vine cutting attachments is effected with only a small number of parts. Specifically, it is a feature of this invention to provide an arrangement wherein the vine cutting attachments are actuated by a connection with the lower or forwardly moving flight of the potato conveyor or elevator chain, and in this connection it is a further feature of this invention to provide a driving connection with the lower flight of the elevator chain which is especially constructed and arranged to interrupt the drive in the event the cutting attachments, or either of them, should become overloaded.

These and other objects and advantages of the present invention will be apparent to those skilled in the art after a consideration of the following detailed description, taken in conjunction with the accompanying drawings in which:

Figure 2 is a sectional view taken generally along the line 2—2 of Figure 1; and Figure 3 is a fragmentary plan view, certain parts being omitted in order to show the other parts more clearly.

Figure 1:
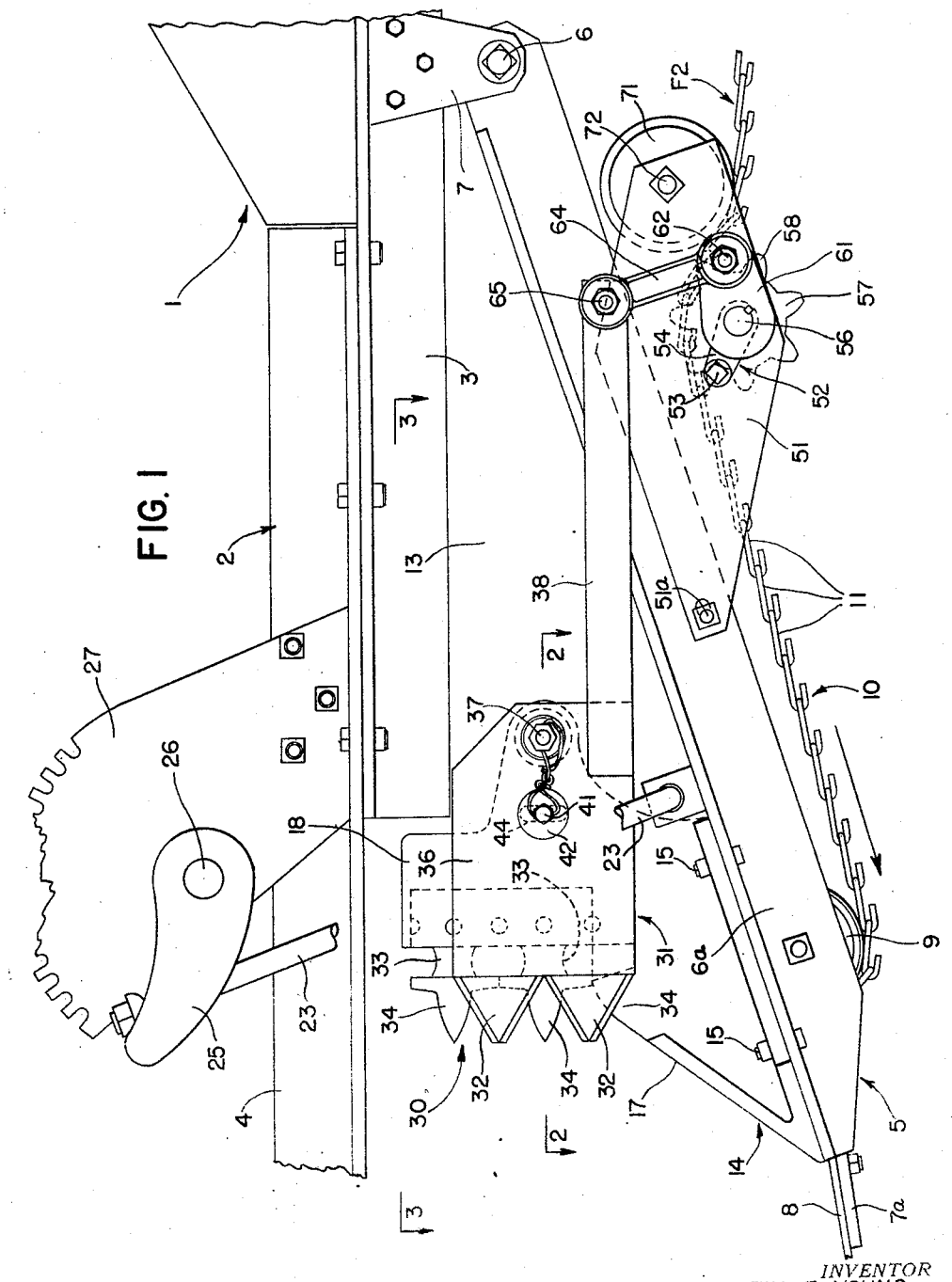
Figure 1 is a side view of a potato digger in which the principles of the present invention have been incorporated.

Referring now to the drawings, particularly Figure 1, it will be seen that the potato digger, indicated in its entirety by the reference numeral 1, is similar to the potato digger shown in the United States patent to Cook 2,172,435, dated September 12, 1939, to which reference may be had if necessary. The potato digger 1 includes a main supporting frame 2 including a pair of laterally spaced generally longitudinally extending frame angles 3 to the forward ends of which are bolted front frame angles 4 with which hitch means (not shown) is connected for hitching the digger to a propelling tractor or the like. A shovel unit 5 is pivotally connected, as at 6, to brackets 7 fixed to the main frame 2. The shovel unit 5 comprises longitudinally and downwardly extending shovel frame members 6a connected at their front ends by a plate 7a which forms a support for a digging shovel 8. A plurality of rollers 9 are mounted for rotation on the shovel unit and support an endless potato conveyor or elevator chain 10, which is made up of a plurality of links 11. The shovel unit 5 is provided with sides 13 which include forward nose sections 14 bolted, as at 15, to the forward ends of the shovel frame angles 6a. These nose sections 14 have rearwardly and upwardly extending edges 17 and terminate rearwardly and upwardly in vine cutter receiving bracket sections 18.

The shovel unit 5 is raised and lowered by means of a pair of links 23 connected at their lower ends by brackets 24 to the shovel frame angles 6a. The upper ends of the links 23 are pivotally connected in the forward ends of a pair of lift arms 25 that are carried by an upper transverse shaft 26. The latter may be actuated by any suitable means, such as a hand lever (not shown) operating in conjunction with a notched sector 27 for raising and lowering the front or shovel end of the shovel unit 5.

A vine cutting unit 30 is disposed at each side of the shovel unit 5, and each vine cutting unit comprises a cutter bar 31 on which is mounted a pair of cutter bar sections 32, and a plurality of guards 33 and ledger plates 34, mounted on the upper bracket section 18 of the associated nose section 14. The cutter bar 31 preferably is in the form of a plate 36 that is pivoted, as at 37, on the bracket section 18 and is provided with a rearwardly extending arm 38. The cutter bar is oscillatable or reciprocable generally in a vertical direction about the axis defined by the bolt 37, and the cutter bar sections 32 are held against the ledger plates 34 by suitable hold down means such as a bolt and washer, indicated at 41 and 42, carried by the bracket section 18, the cutter bar plate 36 being slotted, as at 44, to accommodate the aforesaid oscillation or reciprocation.

For driving the vine cutter units 30, a pair of brackets 51 are bolted, as at 51a, to the shovel frame angles 6a and extend downwardly from the vertical flange thereof. Each bracket 51 is apertured to receive a bearing 52 which is fixed to the associated plate 51 by suitable means, such as a bolt and bearing extension 53 and 54. The bearing members 52 receive a transverse shaft 56 which passes underneath the lower flight of the potato chain 10, there being a pair of sprockets 57 fixed in any suitable manner to the shaft 56 and having teeth 58 arranged to receive the links making up the potato chain 10. Each end of the shaft 56 receives a crank arm 61, and the outer end of each crank arm 61 carries a crank pin 62 on which the lower end of a pitman rod 64 is received. The upper end of the pitman rod 64 is pivotally connected, as at 65, to the rear end of the associated cutter bar actuating arm 38. The elevator or potato conveyor chain 10 is normally driven by means (not shown) on the potato digger so that the upper flight F1 carrying the potatoes and adhering soil moves upwardly and rearwardly while the lower flight F2 moves downwardly and forwardly in the direction of the arrow shown in Figure 1. In order to drive the shaft 56 the lower or normally slack flight of the chain is trained over the vine cutter drive sprockets 57 on the shaft 56, as shown in Figures 1 and 3. The lower flight of the chain 10 is guided as it approaches the sprockets 57 by a pair of idlers 71 which are supported by suitable bearing means 72 from the bracket plates 51. As best shown in Figure 1, only a relatively small number of links are engaged with the sprockets 57 at any one time, and the angle of the teeth 58, taken at the angle at which the lower flight of the chain 10 approaches the sprockets, is an obtuse angle, such that under normal loads the sprockets 57 rotate as the chain 10 is driven, oscillating the cutter bars 31 and severing all vines, trash and the like that enter the cutting units, the front edge 17 of the nose section 14 serving to lift and guide vines toward the cutter units. However, due to the fact that the chain links bear against the teeth on the sprockets 57 at an obtuse angle, if the cutter units should be subjected to an overload, the lower flight of the chain 10 will automatically lift off of the sprockets 57, thereby protecting the other parts against breakage.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A potato digger comprising a frame, a shovel unit carried thereby and including a potato conveyor chain having upper and lower flights, generally vertical sides carried by said shovel unit, a vine cutting unit carried at the forward portion of each of said sides, a transverse shaft supported for rotation on said shovel unit adjacent said lower flight, sprockets mounted on said shaft and receiving the lower flight of said chain, whereby operation of said chain serves to rotate said shaft, and means for driving both of said vine cutting units from said shaft.

2. A potato digger comprising a main frame, a shovel frame pivoted to said main frame and having sides, a shovel and a conveyor chain movably supported thereon, a pair of vine cutters, one mounted on each side of said shovel frame adjacent the forward end thereof, a pair of sprockets rotatably mounted on the underside of said shovel frame and underneath the lower run of said chain rearwardly of said vine cutters and spaced apart laterally to receive the side portions of said chain whereby movement of the latter rotates said sprockets, and cranks driven by said sprockets and connected with said vine cutters for driving the associated vine cutter at each side of the shovel frame.

3. A potato digger comprising a shovel unit having a forwardly extending shovel and generally upwardly extending nose sections at each end of the shovel, an arm pivotally mounted on each of said nose sections, a cutter bar fixed in generally vertical position on the forward end of each of said arms, cooperating guards and ledger plates mounted stationarily on said nose sections in cooperation with said cutter bars, a transverse shaft supported for rotation on said shovel unit adjacent the rear ends of said arms, a crank at each end of said shaft, a pitman connecting each crank with the rear end of the associated arms, a conveyor chain having an upper flight supported on said shovel unit, and sprockets mounted on said shaft and receiving the lower flight of said chain, whereby operation of said chain serves to drive said shaft.

4. A potato digger comprising a frame, a shovel unit carried thereby and including an endless conveyor chain having upper and lower flights, a pair of generally vertically disposed vine cutting units carried at each side of the forward portion of said shovel unit, a pair of laterally spaced sprockets rotatably carried by said shovel unit underneath and meshing with the lower flight of said chain and supporting at least a portion of the lower flight of said chain, and means actuated by said sprockets for driving said vine cutting units.

5. A potato digger comprising a frame, a shovel unit carried thereby and including an endless conveyor chain having upper and lower flights, a pair of generally vertically disposed vine cutting units carried at each side of the forward portion of said shovel unit, a pair of laterally spaced sprockets rotatably carried by said shovel unit underneath and meshing with the lower flight of said chain and supporting at least a portion of the lower flight of said chain, means carried by said shovel unit and engageable with the lower flight of said chain for guiding said lower flight whereby only a limited number of links of said chain engage the sprockets, and means for driving said cutter units from said sprockets, the number of teeth on said sprockets and the number of links engaging said sprockets being such that, in the event said vine cutter units are subjected to an abnormal load, the lower flight of said chain will lift off said sprockets, thereby interrupting the drive to said vine cutting units.

6. In a potato digger or the like having a frame, movable means including a chain, the combination therewith of a part to be driven from said chain including a toothed sprocket, the teeth thereof being adapted to receive the links of said chain, and means mounted on said frame adjacent said sprocket for guiding said chain during its movement toward said sprocket so that a limited number of links will engage the sprocket at a time, whereby the links of said chain will lift off the teeth of said sprocket upon the occurrence of an overload.

7. A potato digger comprising a main frame, a shovel frame pivoted to said main frame and having sides, a shovel and a conveyor chain movably supported thereon, a pair of vine cutters, one mounted on each side of said shovel frame adjacent the forward end thereof, a pair of sprockets rotatably mounted on the underside of said shovel frame and underneath the lower run of said chain rearwardly of said vine cutters and spaced apart laterally to receive the side portions of said chain whereby movement of the latter rotates said sprockets, and means driven by said sprockets and connected with said vine cutters for driving the associated vine cutter at each side of the shovel frame.

AUSTIN E. YOUNG.

REFERENCES CITED

The following references are of record in the file of this patent:

UNITED STATES PATENTS

| Number | Name | Date |
|---|---|---|
| 83,185 | Lurvey | Oct. 20, 1868 |
| 96,153 | Singley | Oct. 26, 1869 |
| 1,231,867 | Elrod | July 3, 1917 |
| 2,373,426 | Spafford | Apr. 10, 1945 |
| 2,466,113 | Knowles | Apr. 5, 1949 |